United States Patent
Koybayashi (10) Patent No.: US 9,840,297 B2
(45) Date of Patent: Dec. 12, 2017

(54) FUEL FILLING DEVICE FOR MOTORCYCLE

(71) Applicant: SUZUKI MOTOR CORPORATION, Hamamatsu-Shi, Shizuoka-Ken (JP)

(72) Inventor: Manabu Koybayashi, Hamamatsu (JP)

(73) Assignee: Suzuki Motor Corporation (JP)

( * ) Notice: Subject to any disclaimer, the term of this patent is extended or adjusted under 35 U.S.C. 154(b) by 23 days.

(21) Appl. No.: 15/159,138

(22) Filed: May 19, 2016

(65) Prior Publication Data

US 2016/0339980 A1 Nov. 24, 2016

(30) Foreign Application Priority Data

May 20, 2015 (JP) .................................. 2015-102520

(51) Int. Cl.
*B62J 37/00* (2006.01)
*B62H 1/04* (2006.01)
*B62J 27/00* (2006.01)
*B62J 99/00* (2009.01)

(52) U.S. Cl.
CPC ................ *B62J 37/00* (2013.01); *B62H 1/04* (2013.01); *B62J 27/00* (2013.01); *B62J 2099/002* (2013.01); *B62K 2202/00* (2013.01); *B62K 2204/00* (2013.01)

(58) Field of Classification Search
CPC ...... B62J 37/00; B62J 27/00; B62J 2099/002; B62H 1/04; B62K 2202/00; B62K 2204/00
See application file for complete search history.

(56) References Cited

U.S. PATENT DOCUMENTS

2007/0092764 A1* 4/2007 Kobayashi ............... B62M 7/02 429/9
2007/0166584 A1* 7/2007 Kurosawa ........... B60L 11/1887 429/415

FOREIGN PATENT DOCUMENTS

JP 2010241234 A 10/2010

* cited by examiner

*Primary Examiner* — Kevin Hurley
*Assistant Examiner* — Marlon A Arce
(74) *Attorney, Agent, or Firm* — Barnes & Thornburg LLP (57) ABSTRACT

A fuel filling device of a motorcycle can receive a high pressure gas only when it is ensured that the motorcycle is in a stable position. The device includes a fuel tank that stores and/or supplies a high pressure gas and is mounted on the motorcycle, a filling port through which the high pressure gas is fed to the fuel tank, a center stand that swings between a raised position in which the center stand supports the motorcycle in an upright position and a retracted position, a stand sensor that senses that the center stand is in the raised position, and a fuel filling valve provided between the fuel tank and the filling port and allowing a flow of the high pressure gas between the fuel tank and the filling port if the stand sensor senses that the center stand is in the raised position.

5 Claims, 6 Drawing Sheets

FUEL FILLING DEVICE FOR MOTORCYCLE

CROSS-REFERENCE TO RELATED APPLICATIONS

This application claims the benefit of priority of Japanese Patent Application No. 2015-102520, filed on May 20, 2015, the entire contents of which are incorporated herein by reference.

BACKGROUND OF THE INVENTION

Field of the Invention

The present invention relates to a fuel filling device of a motorcycle.

Description of the Related Art

There is a motorcycle that runs on an electric motor driven by electric power generated by a fuel cell from a high pressure gas, such as hydrogen.

The motorcycle of this type includes a gas tank that stores and/or supplies a high pressure gas as a fuel and a filling port through which the high pressure gas is fed to the gas tank for storage. With the motorcycle, the gas tank is filled with the high pressure gas by coupling the filling port to a filling nozzle connected to a gas tank at an installation that is equivalent to a gas station for a gasoline motorcycle.

When the high pressure gas filling nozzle is coupled to the filling port, a force is correspondingly exerted to the motorcycle. With a known fuel filling device of a motorcycle, a body is supported by a center stand to prevent the motorcycle from overturning, and the filling port is inclined at an angle to the vertical direction while the body is in the upright position so that the filling nozzle is inserted obliquely from above into the filling port (see Japanese Patent Laid-Open No. 2010-241234, for example).

SUMMARY OF THE INVENTION

With a motorcycle using a high pressure gas such as hydrogen, it is important to ensure safety by keeping the motorcycle in a stable position during filling with the high pressure gas.

If the motorcycle using the high pressure gas can allow filling with the high pressure gas only when the motorcycle senses that the motorcycle is in the stable position, the safety can be further improved.

In view of this, the present invention proposes a fuel filling device of a motorcycle that can allow filling with a high pressure gas only when the fuel filling device senses that the motorcycle is in a stable position.

To solve the problems described above, a fuel filling device of a motorcycle according to the present invention includes a gas tank that stores and/or supplies a high pressure gas, the gas tank being mounted on the motorcycle, a filling port through which the high pressure gas is fed to the gas tank for storage, a center stand that swings between a raised position in which the center stand supports the motorcycle in an upright position and a retracted position, a stand sensor that senses that the center stand is in the raised position, and a fuel filling valve provided between the gas tank and the filling port, the fuel filling valve allowing a flow of the high pressure gas between the gas tank and the filling port if the stand sensor senses that the center stand is in the raised position.

In preferred embodiments of the above aspect, the following modes may be provided.

It may be further desired that an overturn sensor that senses that the motorcycle is in a process of overturning or the motorcycle has overturned, wherein the fuel filling valve allows the flow of the high pressure gas between the gas tank and the filling port until the overturn sensor senses that the motorcycle is in a process of overturning or the motorcycle has overturned.

It may be desired that the fuel filling valve cuts off the flow of the high pressure gas between the gas tank and the filling port once the overturn sensor senses that the motorcycle is in a process of overturning or the motorcycle has overturned.

It may be further desired that a fuel supply valve that is provided on a supply side of the gas tank, wherein the fuel supply valve cuts off a flow of the high pressure gas on the supply side of the gas tank once the overturn sensor senses that the motorcycle is in a process of overturning or the motorcycle has overturned.

The present invention provides a fuel filling device of a motorcycle that can receive a high pressure gas only when it is ensured that the motorcycle is in a stable position.

DETAILED DESCRIPTION OF THE PREFERRED EMBODIMENT

In the following, a fuel filling device of a motorcycle according to an embodiment of the present invention will be described with reference to FIGS. 1 to 6.

Figure 1:
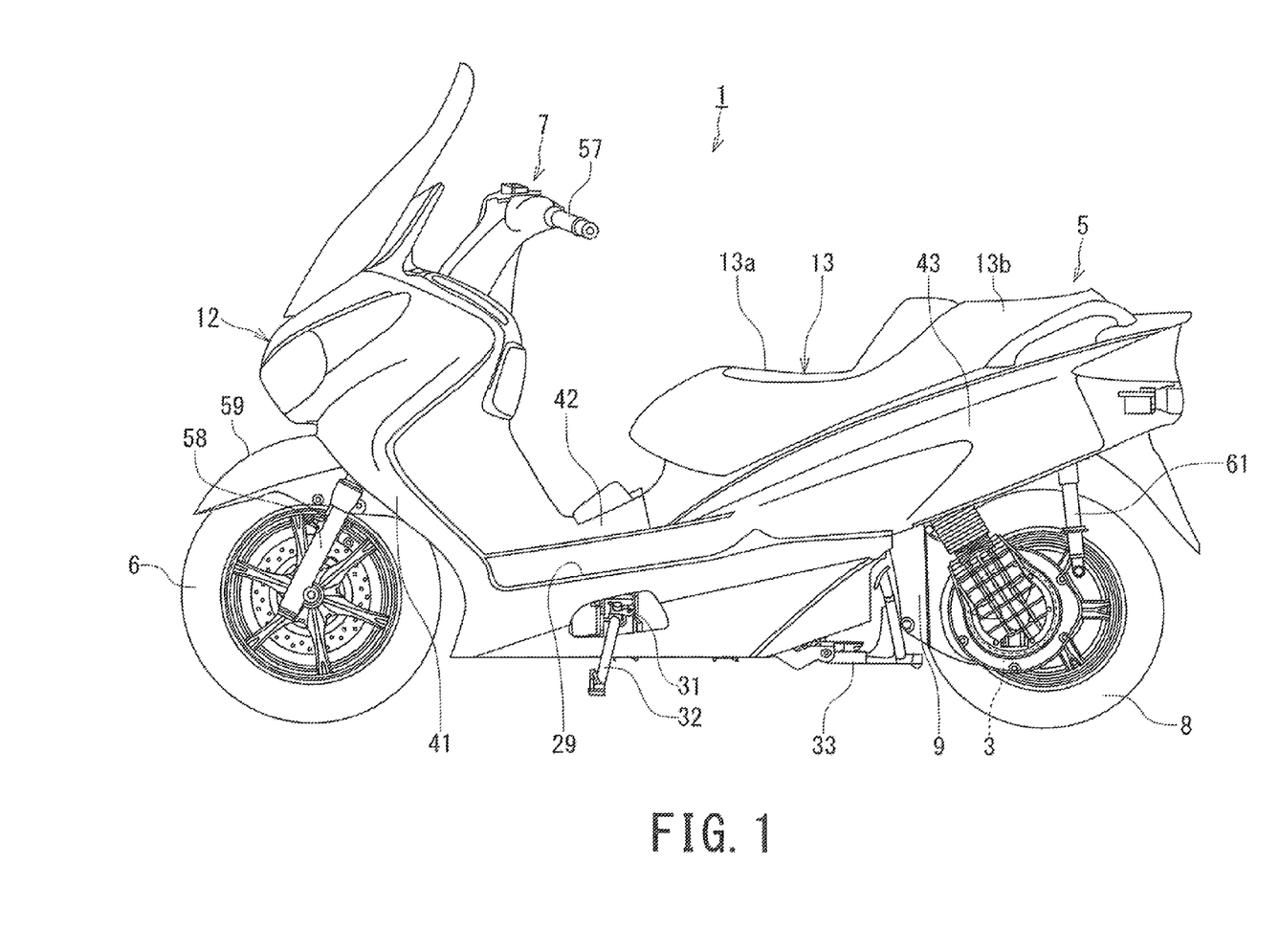
FIG. 1 is a left side view of a motorcycle that incorporates a fuel filling device according to an embodiment of the present invention.
Figure 2:
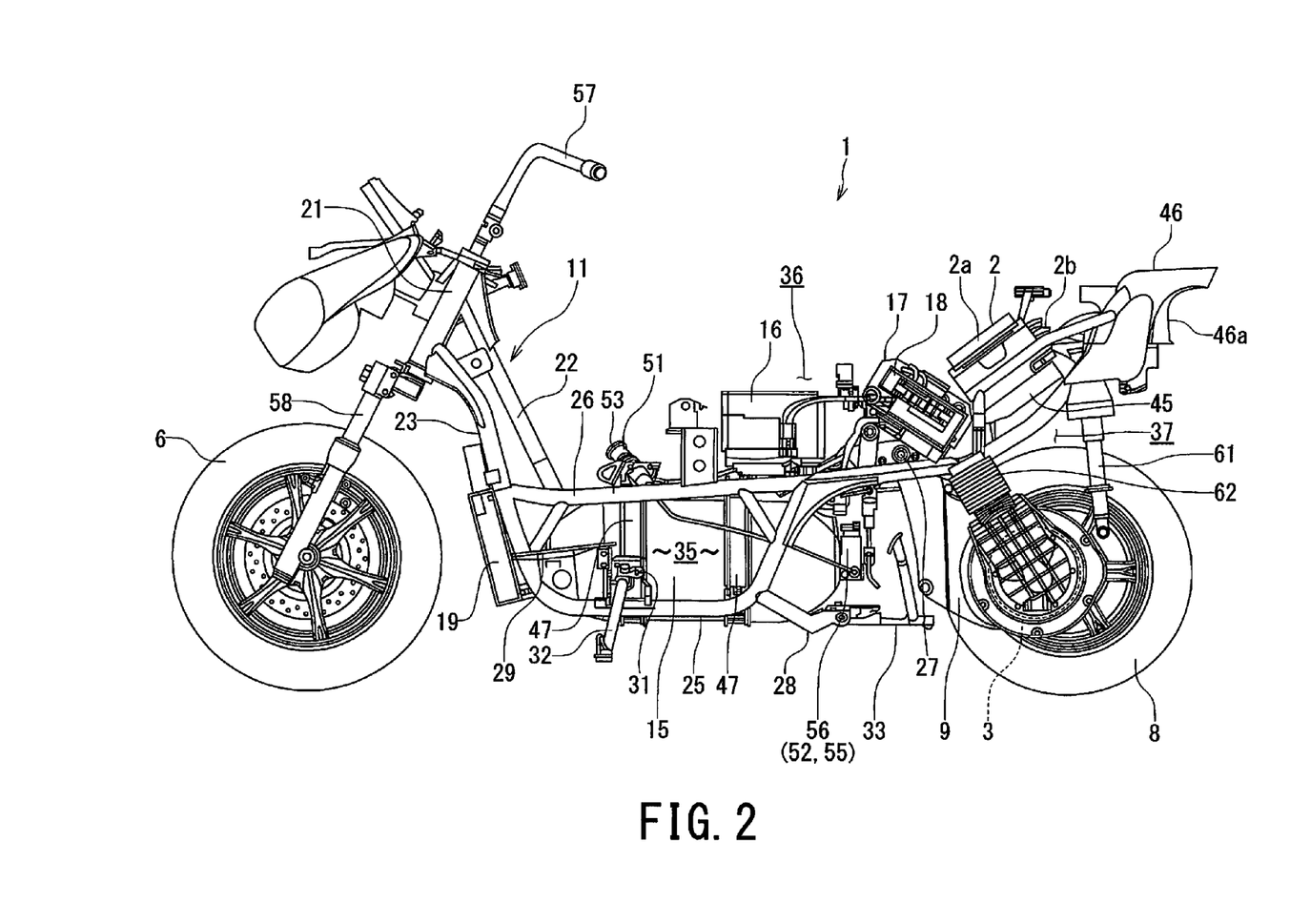
FIG. 2 is a left side view of the motorcycle that incorporates the fuel filling device according to the embodiment of the present invention.

FIGS. 1 and 2 are left side views of a motorcycle that incorporates the fuel filling device according to this embodiment of the present invention.

Figure 3:
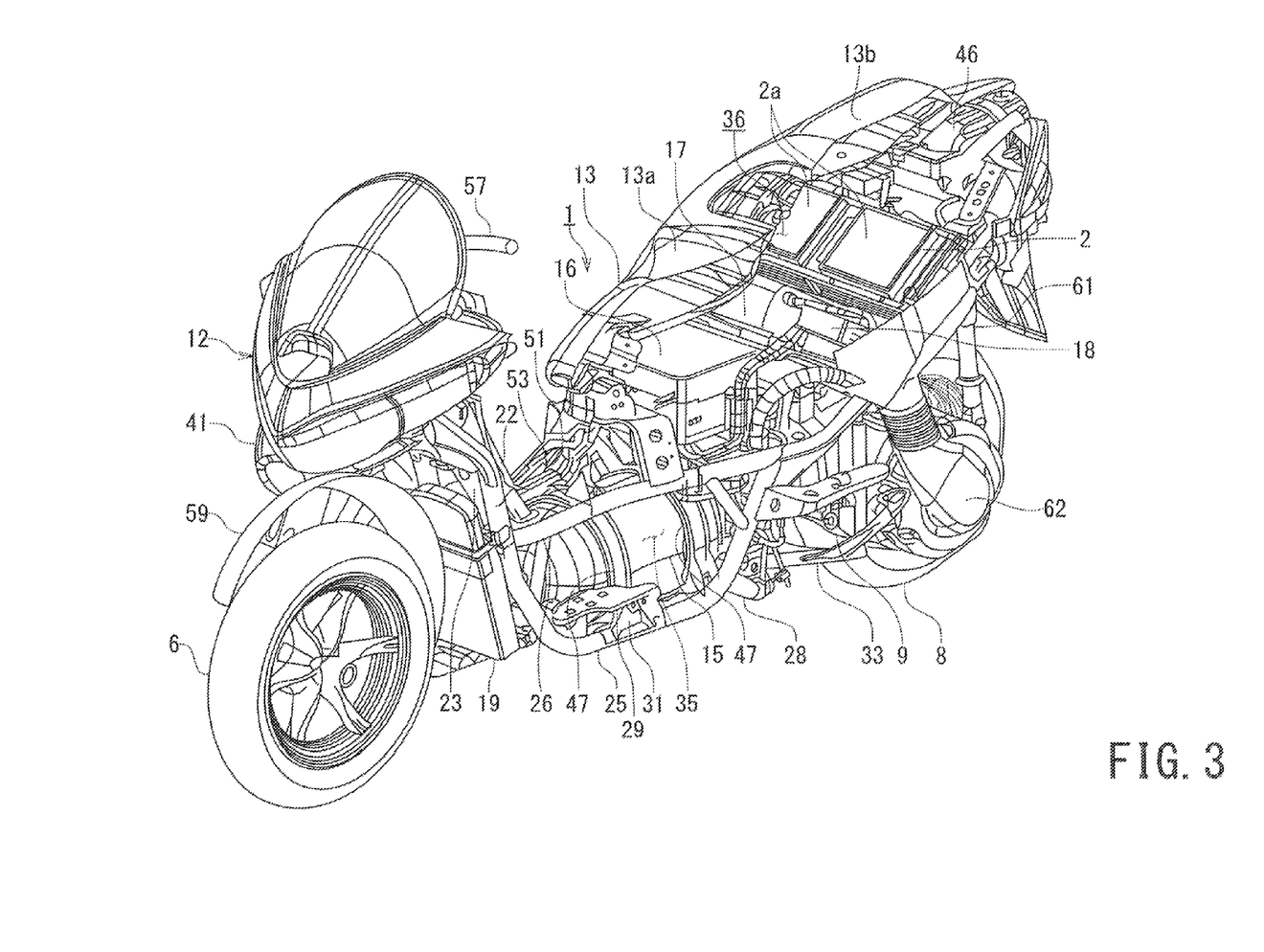
FIG. 3 is a perspective view of the motorcycle according to the embodiment of the present invention.

FIG. 3 is a perspective view of the motorcycle that incorporates the fuel filling device according to this embodiment of the present invention.

In this embodiment, the expressions such as front, rear, top, bottom, left and right are those from the perspective of a driver of a motorcycle 1.

As shown in FIGS. 1 to 3, the motorcycle 1 according to this embodiment is a fuel cell vehicle that runs on a motor 3 that is driven by electric power generated by a fuel cell 2. The motorcycle 1 is a motor scooter, for example.

The motorcycle 1 includes a body 5 that extends in a front-rear direction, a front wheel 6, which serves as a steered wheel, a steering mechanism 7 that supports the front wheel 6 in a steerable manner, a rear wheel 8, which is a driving wheel, the motor 3 that generates a drive force for the rear wheel 8, and a swing arm 9 that supports the rear wheel 8.

The fuel cell 2 generates electric power by reaction of a fuel and an oxidizing agent. The fuel cell 2 is an air-cooled fuel cell system that uses a high pressure gas such as hydrogen gas as the fuel and oxygen in the air as the oxidizing agent.

The body 5 includes a frame assembly 11 that extends in the front-rear direction of the motorcycle 1, an exterior 12 that covers the frame assembly 11, and a seat 13 disposed on top of a rear half part of the frame assembly 11.

The body 5 includes the fuel cell 2, a fuel tank 15 serving as a gas tank that stores the high pressure gas (hydrogen gas as a fuel) and/or from which the high pressure gas is supplied, a secondary battery 16 that supplies auxiliary electric power to the electric power of the fuel cell 2, a power management device 17 that adjusts an output voltage of the fuel cell 2 and controls distribution of the electric power of the fuel cell 2 and the secondary battery 16, a motor controller 18 that converts a direct-current power output from the power management device 17 into a three-phase alternating-current power, outputs the three-phase alternating-current power to the motor 3 and controls operation of the motor 3, and a vehicle controller 19 that manages these components in a centralized manner. In short, a power train of the motorcycle 1 is a hybrid system that has the fuel cell 2 and the secondary battery 16.

The frame assembly 11 comprises a plurality of steel hollow pipes integrated with each other. The frame assembly 11 includes a head pipe 21 disposed on top of a front end thereof, an upper down frame 22 sloping downward to the rear that extends from a middle part of the head pipe 21, a lower down frame 23 sloping downward to the rear that extends from a lower part of the head pipe 21, a pair of left and right lower frames 25, a pair of left and right upper frames 26, a pivot 27, and a guard frame 28.

The head pipe 21 supports the steering mechanism 7 in a steerable manner.

The pair of left and right lower frames 25 are between the lower down frame 23, which is connected to the lower part of the head pipe 21, and the lower frame 25 includes an inclined section sloping downward to the rear that extends from the part connected to the head pipe 21, a curved section extending from a lower end of the inclined section, a straight section that extends rearward from a rear end of the curved section to a middle part of the body 5, a curved section sloping upward to the rear that extends from a rear end part of the straight section, and an inclined section sloping upward to the rear that extends from an upper end part of the latter curved section and merges with the upper frame 26.

The left and right lower frames 25 are each provided with a foot rest 29 for the driver at the forward curved section.

The lower frame 25 disposed on the left side of the body 5 is provided with a side stand bracket 31. The side stand bracket 31 is provided with a side stand 32 that supports the motorcycle 1 in a left-inclined standing position. The side stand 32 can swing between a raised position, in which the side stand 32 supports the motorcycle 1, and a retracted position, in which the side stand 32 is placed along the body 5 not to interfere the motorcycle 1 running.

The pair of left and right upper frames 26 are connected to a middle part of the forward inclined section of the left and right lower frames 25 in a front half part of the body 5, and the upper frame 26 includes a substantially horizontal section that extends to the rear of the body 5 from the part connected to the lower down frame 23 and an inclined section significantly sloping upward to the rear to substantially the same level as the head pipe 21 above the rear wheel 8 in a rear half part of the body 5.

The pivot 27 lies between the left and right upper frames 26 in the rear half part of the body 5. The pivot 27 is disposed behind the part where the upper frames 26 and the lower frames 25 merge with each other.

The guard frame 28 lies between the rearward curved sections of the left and right lower frames 25. The guard frame 28 is U-shaped and slopes downward to the rear from the points connected to the lower frames 25. The guard frame 28 is provided with a center stand 33 that supports the motorcycle 1 in an upright position. The center stand 33 can swing between a raised position, in which the center stand 33 supports the motorcycle 1 in the upright position, and a retracted position, in which the center stand 33 is placed along the body 5 not to interfere with the motorcycle 1 running.

The seat 13 extends in the front-rear direction to cover a rear half part of the frame assembly 11 from above. The seat 13 is a tandem seat and includes a front part 13*a* for the driver and a rear part 13*b* for a passenger that are integrated with each other.

A space defined by the left and right upper frames 26 and the left and right lower frames 25 will be referred to as a center tunnel region 35, a space defined by a rear half part of the upper frames 26, the exterior 12 and the seat 13 will be referred to as a device mounting region 36, and a space to the rear of the center tunnel region 35 below the device mounting region 36 will be referred to as a tire housing region 37.

The center tunnel region 35 houses the fuel tank 15.

The device mounting region 36 houses the secondary battery 16, the power management device 17 and the fuel cell 2, which are arranged in this order from the front to the rear of the body 5. The device mounting region 36 further houses the motor controller 18, which is arranged on the left or right side of the power management device 17, such as on the left side of the body 5.

The tire housing region 37 houses the rear wheel 8.

A partition member (not shown) is provided between the device mounting region 36 and the tire housing region 37 to separate the regions from each other.

The exterior 12 includes a front leg shield cover 41 that covers the front half part of the body 5, a front frame cover 42 that is located in an upper middle part of the body 5 and covers the upper frames 26 from above, and a frame cover 43 that is located in the rear half part of the body 5 and covers a lower part of the seat 13 of a side surface of the body 5.

The frame cover 43 surrounds the device mounting region 36 in cooperation with the seat 13. The device mounting region 36 is a closed space defined by the seat 13, the frame cover 43 and the partition member. In the device mounting region 36, a vent hole (not shown) is formed in the frame cover 43 or the partition member at an appropriate position so that a flow of air serving as the oxidizing agent to the fuel cell 2 is easily and reliably controlled. In the device mounting region 36, a flow of air serving to cool a device requiring cooling is easily and reliably controlled. The device mounting region 36 permits air to flow in through gaps between the covers or the like.

The fuel cell 2 is disposed in a rear part of the device mounting region 36. More specifically, the fuel cell 2 is disposed in a part below the rear part 13*b* of the seat 13 where the upper frames 26 significantly slope upward to the rear. The fuel cell 2 is a device that has a flat rectangular parallelepiped shape. The fuel cell 2 has an air inlet port in an intake surface 2a, which has the largest projected area, and an exhaust port 2b in a surface facing to the rear of the motorcycle 1. The fuel cell 2 is oriented with the air intake surface 2a facing forward and upward. More specifically, the fuel cell 2 is fixed to the frame assembly 11 in a forward leaning position to face a step part between the front part 13a and the rear part 13b of the seat 13. Thus, a relatively wide gap is provided between the air intake surface 2a of the fuel cell 2 and the seat 13, and the fuel cell 2 can take in a sufficient amount of atmosphere (air) in the device mounting region 36.

The fuel cell 2 is provided with a fan 45 that generates an intake negative pressure for introducing the atmosphere (air) in the device mounting region 36 to the air intake surface 2a. The fuel cell 2 generates electric power by chemical reaction between the high pressure gas (hydrogen gas as a fuel) supplied from the fuel tank 15 and the oxygen in the air, and then discharges any moist excessive gas through the exhaust port 2b. During the power generation process, the fuel cell 2 is cooled by air. An exhaust duct 46 is connected to the exhaust port 2b.

The exhaust duct 46 is disposed at the rear of the fuel cell 2 and guides an exhaust gas of the fuel cell 2 to an exhaust port 46a, which opens at a rear end of the body 5. The exhaust duct 46 is connected to the exhaust port 2b of the fuel cell 2 at a lower front end part thereof. The exhaust port 46a is disposed above the exhaust port 2b of the fuel cell 2 or, preferably, provided in an upper rear part of the exhaust duct 46. Since the exhaust duct 46 has the exhaust port 46a disposed above the exhaust port 2b of the fuel cell 2, a wet excessive gas containing an unreacted hydrogen gas can be discharged from the body 5 with reliability.

The fuel tank 15 is a high pressure compressed hydrogen storage system, which is an aluminum cylinder liner-type composite container for storing the hydrogen gas serving as the fuel of the fuel cell 2. For example, the fuel tank 15 is a container capable of storing hydrogen gas of approximately 30 MPa to 70 MPa. The fuel tank 15 is a cylindrical gas tank having a dome-shaped panel at a front and a rear end thereof. The fuel tank 15 is mounted in the center tunnel region 35 with a centerline of a cylindrical trunk thereof being oriented in the front-rear direction of the body 5.

A cramping band 47 that fastens the fuel tank 15 lies between the left and right lower frames 25.

A coupling 51 and a fuel filling valve 52 are in fluid communication with the fuel tank 15, and the coupling 51 and the fuel filling valve 52 are arranged in this order viewed from the side at which the high pressure gas is supplied.

The coupling 51 has a filling port 53 through which the high pressure gas (hydrogen gas as a fuel) is fed to the fuel tank 15 for storage. The coupling 51 is disposed above the trunk part of the fuel tank 15 and extends upward from the body 5.

The filling port 53 is located outside of the device mounting region 36, in the vicinity of the upper down frame 22, and in the vicinity of, and above, the front panel of the fuel tank 15. The filling port 53 is sufficiently separated from the secondary battery 16. The filling port 53 is covered with the front frame cover 42. More specifically, the filling port 53 is covered with a lid (not shown) of the front frame cover 42 that can be opened and closed.

The filling port 53 faces up to the right of the body 5. When the lid of the front frame cover 42 is opened to fill the fuel tank 15 with the fuel, there is a space open to the atmosphere above the filling port 53. Therefore, even if the high pressure gas (hydrogen gas as a fuel) leaks when the fuel tank 15 is filled with the high-pressure gas (hydrogen gas as a fuel), the fuel leakage does not accumulate in the front frame cover 42.

The fuel filling valve 52 is provided between the fuel tank 15 and the filling port 53. When the fuel tank 15 is to be filled with the high pressure gas (hydrogen gas as a fuel), the fuel filling valve 52 is opened to allow filling of the fuel tank 15 with the high pressure gas (hydrogen gas as a fuel) through the filling port 53. The fuel filling valve 52 is provided in a valve unit 56, which is provided on top of the rear panel of the fuel tank 15.

The fuel tank 15 is provided with a fuel supply valve 55 on the side at which the high pressure gas (hydrogen gas as a fuel) is supplied (specifically, on the side of the fuel cell 2 and between the fuel tank 15 and the fuel cell 2). The fuel supply valve 55 is provided in the valve unit 56 located on top of the rear panel of the fuel tank 15 along with the fuel filling valve 52.

The secondary battery 16 is a box-shaped lithium ion battery. The secondary battery 16 is disposed at the front of the device mounting region 36, more specifically, disposed above the rear panel of the fuel tank 15 and below the front part 13a of the seat 13, in a substantially upright position on a virtual horizontal plane of the motorcycle 1.

The power management device 17 is disposed between the secondary battery 16 and the fuel cell 2. The power management device 17 is a device having a flat rectangular parallelepiped shape and is fixed to the frame assembly 11 in an inclined position with a top surface thereof facing up to the rear toward the fuel cell 2.

The motor controller 18 placed at the side of the power management device 17 is disposed between the secondary battery 16 and the fuel cell 2, as with the power management device 17. The motor controller 18 is also a device having a flat rectangular parallelepiped shape and is fixed to the frame assembly 11 in an inclined position with a top surface thereof facing up to the rear toward the fuel cell 2.

With the secondary battery 16, the power management device 17, the motor controller 18 and the fuel cell 2 arranged as described above, the motorcycle 1 has advantages that devices that are electrically closely related to each other can be arranged as closest to each other as possible, and the length of the wires between the devices and the weight of the wiring can be reduced.

The vehicle controller 19 is disposed at the front of the lower frames 25 and faces to the front panel of the fuel tank 15.

The steering mechanism 7 is disposed in a front part of the body 5. The steering mechanism 7 horizontally rotates about the head pipe 21 of the frame assembly 11 to allow steering of the front wheel 6. The steering mechanism 7 includes a handle 57 provided at the top thereof and a pair of left and right front forks 58 that are slightly inclined to the rear and couple the handle 57 to the front wheel 6. The left and right front forks 58 have a telescopic structure capable of elastically expanding and shrinking. The left and right front forks 58 rotatably support the front wheel at a lower end thereof and support a front fender 59 above the front wheel 6.

The front wheel 6 is a driven wheel capable of rotating about an axle lying between the lower ends of the left and right front forks 58.

The swing arm 9 vertically swings about the pivot 27 as a center of rotation that extends in a left-right direction of the body 5. The swing arm 9 is a so-called cantilever and supports the rear wheel 8 at one of the left and right sides (left side, in this example) of the body 5. A rear suspension 61 lies between the frame assembly 11 and the swing arm 9 and absorbs the shock of a fluctuation of the swing arm 9.

A cooling duct 62 connects the device mounting region 36 and the motor 3 to each other and guides the air in the device mounting region 36 to cool the motor 3.

The rear wheel 8 is a drive wheel capable of rotating about an axle that extends like a cantilever from one of the left and right sides (left side, in this example) of the body 5 at a rear end of the swing arm 9.

The motor 3 is a prime mover that rotationally drives the rear wheel 8 on the electric power generated by the fuel cell 2. The motor 3 is housed in the swing arm 9. The motor 3 and the swing arm 9 are integrated with each other to form a unit swing arm.

Next, a fuel filling device 71 of the motorcycle 1 will be described.

Figure 4:
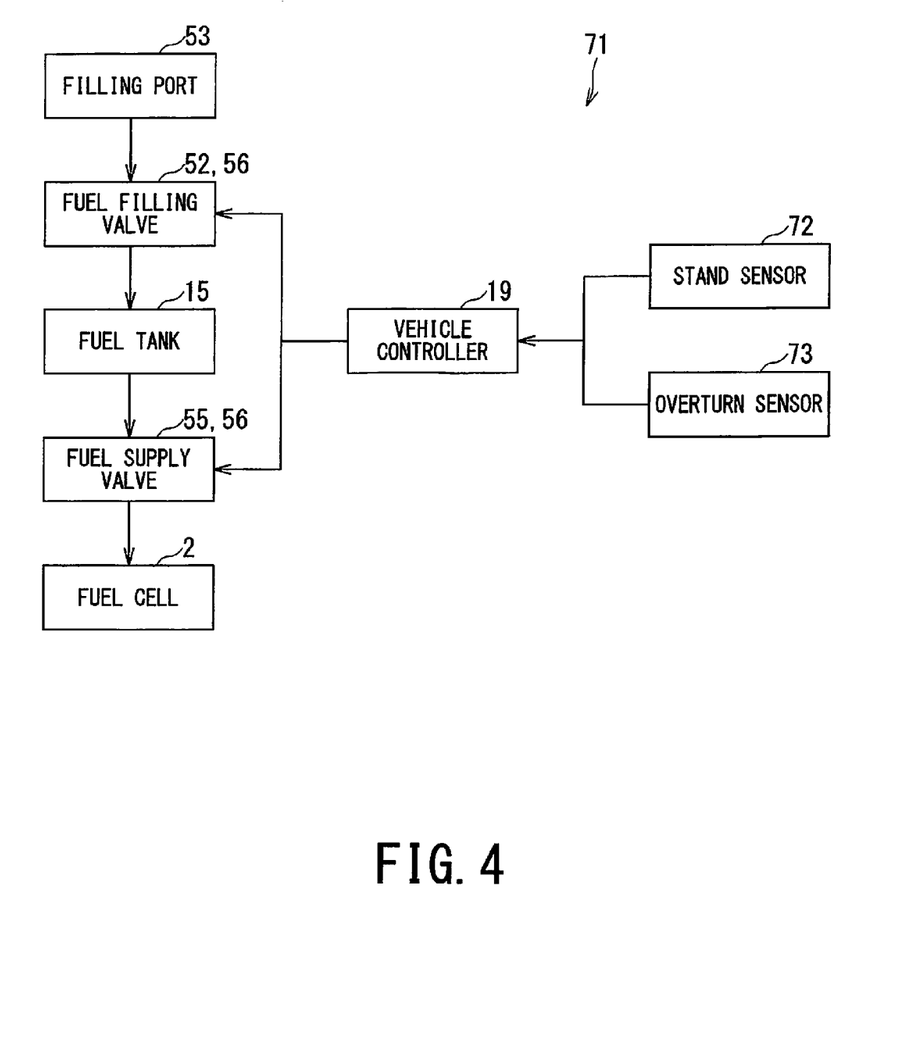
FIG. 4 is a block diagram showing the fuel filling device of the motorcycle according to the embodiment of the present invention.

FIG. 4 is a block diagram showing a fuel filling device of the motorcycle according to this embodiment of the present invention.

As shown in FIG. 4, the fuel filling device 71 of the motorcycle 1 according to this embodiment includes a stand sensor 72 that senses that the center stand 33 is in the raised position, in addition to the fuel tank 15, the filling port 53, the center stand 33 and the fuel filling valve 52.

The stand sensor 72 is a contact-type switch, such as a micro switch or a limit switch, or a non-contact-type switch, such as a photoelectric switch or a proximity switch, and senses the position of the center stand 33 swinging in a swing range. The stand sensor 72 provides a different sensed state depending on whether it is estimated that the center stand 33 is in the raised position and the motorcycle 1 stands upright or otherwise. For example, the stand sensor 72 informs a change of sensed state to the vehicle controller 19 by outputting an ON signal if it is estimated that the center stand 33 is in the raised position and the motorcycle 1 stand upright and an OFF signal otherwise. The sensed state and the output signal can also be related in an opposite way.

The fuel filling device 71 further includes an overturn sensor 73 that senses that the motorcycle 1 is in a process of overturning or the motorcycle 1 has overturned.

The overturn sensor 73 may constantly sense the inclination of the motorcycle 1 by means of an acceleration sensor or sense whether or not the motorcycle 1 is inclined at an angle equal to or greater than an arbitrary predetermined angle.

The stand sensor 72 and the overturn sensor 73 are electrically connected to the vehicle controller 19 and output the respective sensed states.

The fuel filling valve 52 is a solenoid controlled valve that allows or cuts off the flow of the high pressure gas (hydrogen gas as a fuel) from the filling port 53 to the fuel tank 15. The fuel filling valve 52 is opened and closed in response to a command from the vehicle controller 19 to allow and cut off the flow of the high pressure gas from the filling port 53 to the fuel tank 15.

If the stand sensor 72 has sensed that the center stand 33 is in the raised position, the fuel filling valve 52 allows the flow of the high pressure gas (hydrogen gas as a fuel) between the fuel tank 15 and the filling port 53. Alternatively, on condition that the center stand 33 is in the raised position, for example, the fuel filling valve 52 may allow the flow of the high pressure gas (hydrogen gas as a fuel) when a key operation for filling or an operation to open the lid is performed.

If the stand sensor 72 has sensed that the center stand 33 is in a position other than the raised position, the fuel filling valve 52 cuts off the flow of the high pressure gas (hydrogen gas as a fuel) between the fuel tank 15 and the filling port 53.

Furthermore, until the overturn sensor 73 senses that the motorcycle 1 is in a process of overturning or the motorcycle 1 has overturned, the fuel filling valve 52 allows the flow of the high pressure gas (hydrogen gas as a fuel) between the fuel tank 15 and the filling port 53.

Furthermore, after the overturn sensor 73 senses that the motorcycle 1 is in a process of overturning or the motorcycle 1 has overturned, the fuel filling valve 52 cuts off the flow of the high pressure gas (hydrogen gas as a fuel) between the fuel tank 15 and the filling port 53. Note that the expression "the motorcycle 1 is in a process of overturning or the motorcycle has overturned" means not only a case where the motorcycle 1 is actually in a process of overturning or the motorcycle has actually overturned but also a case where the motorcycle 1 has been inclined to an angle at which the motorcycle 1 may overturn and a case where a change of the inclination of the motorcycle 1 is detected and an overturn of the motorcycle 1 is expected.

The fuel supply valve 55 is a solenoid controlled valve that is provided between the fuel tank 15 and the fuel cell 2 and allows or cuts off the flow of the high pressure gas (hydrogen gas as a fuel) from the fuel tank 15 to the fuel cell 2. The fuel supply valve 55 is opened and closed in response to a command from the vehicle controller 19 to allow and cut off the flow of the high pressure gas from the fuel tank 15 to the fuel cell 2. A flow channel from the fuel tank 15 to the fuel cell 2 is referred to as a flow channel on a supply side of the fuel tank 15.

If the stand sensor 72 has sensed that the center stand 33 is in a position other than the raised position, the fuel supply valve 55 allows the flow of the high pressure gas (hydrogen gas as a fuel) on the supply side of the fuel tank 15. Alternatively, on condition that the center stand 33 is in a position other than the raised position, the fuel supply valve 55 may allow the flow of the high pressure gas when a further condition, such as that a key operation for operation of the fuel cell 2 is performed, is satisfied.

If the stand sensor 72 has sensed that the center stand 33 is in the raised position, the fuel supply valve 55 cuts off the flow of the high pressure gas (hydrogen gas as a fuel) on the supply side of the fuel tank 15. That is, the fuel supply valve 55 inhibits power generation of the fuel cell 2 when the center stand 33 is in the raised position.

Furthermore, until the overturn sensor 73 senses that the motorcycle 1 is in a process of overturning or the motorcycle 1 has overturned, the fuel supply valve 55 allows the flow of the high pressure gas (hydrogen gas as a fuel) on the supply side of the fuel tank 15.

Furthermore, after the overturn sensor 73 senses that the motorcycle 1 is in a process of overturning or the motorcycle 1 has overturned, the fuel supply valve 55 cuts off the flow of the high pressure gas (hydrogen gas as a fuel) on the supply side of the fuel tank 15. Note that the expression "the motorcycle 1 is in a process of overturning or the motorcycle has overturned" means not only a case where the motorcycle 1 is actually in a process of overturning or the motorcycle has actually overturned but also a case where the motorcycle 1 has been inclined to an angle at which the motorcycle 1 may overturn and a case where a change of the inclination of the motorcycle 1 is detected and an overturn of the motorcycle 1 is expected.

Figure 5:
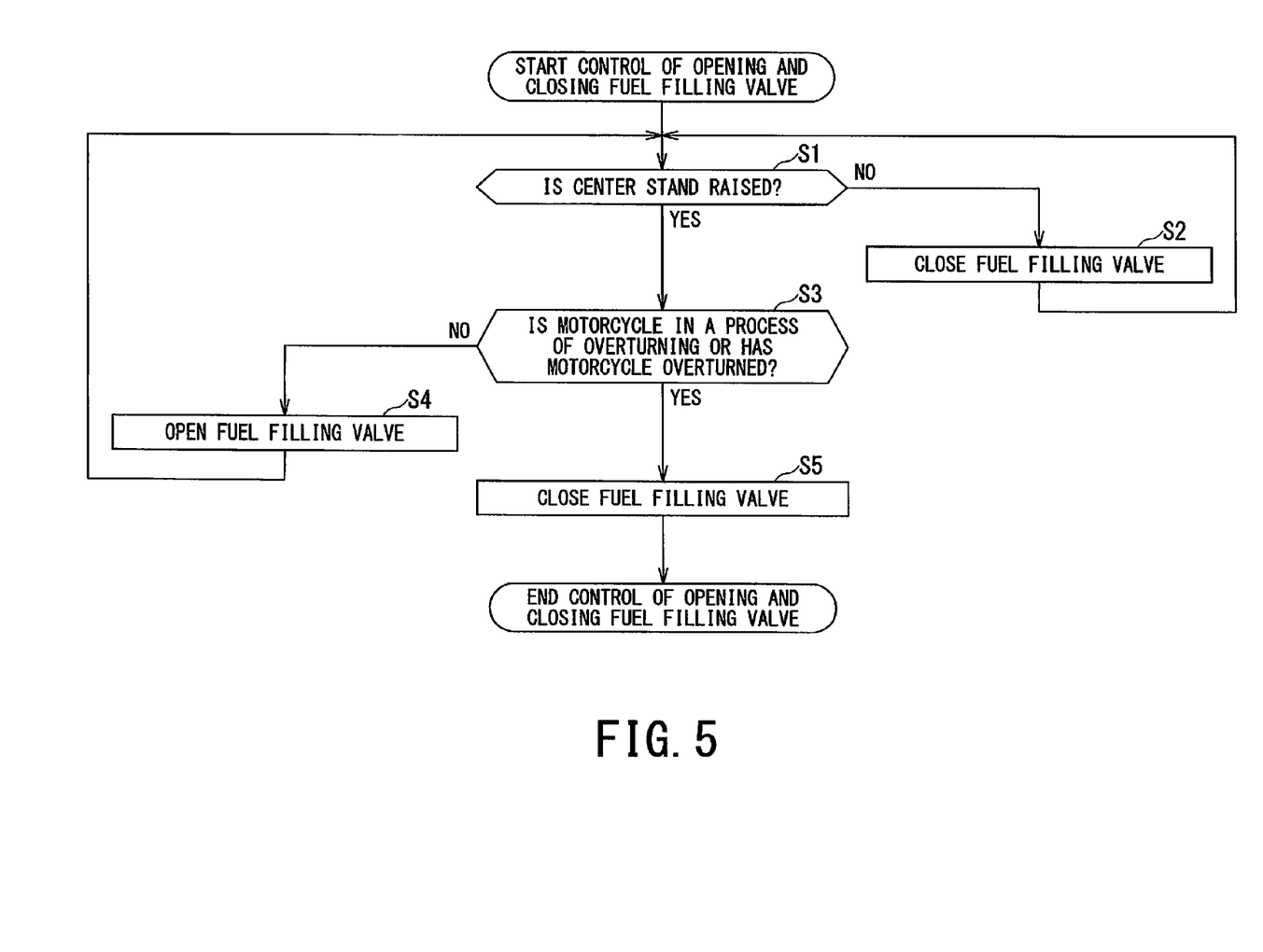
FIG. 5 is a flowchart showing a control of opening and closing a fuel filling valve performed by the fuel filling device according to the embodiment of the present invention.

Next, a control of opening and closing the fuel filling valve 52 performed by the fuel filling device 71 according to this embodiment will be described.

FIG. 5 is a flowchart showing the control of opening and closing the fuel filling valve performed by the fuel filling device according to this embodiment of the present invention.

As shown in FIG. 5, with the fuel filling device 71 according to this embodiment, the vehicle controller 19 receives the sensed state from the stand sensor 72 and determines whether the center stand 33 is in the raised position or a position other than the raised position, such as the retracted position (Step S1). If the vehicle controller 19 determines that the center stand 33 is in a position other than the raised position, such as the retracted position (if No in Step S1), the vehicle controller 19 closes the fuel filling valve 52 to cut off the fluid connection between the filling port 53 and the fuel tank 15 to prevent the fuel tank 15 from being filled with the high pressure gas (hydrogen gas as a fuel) (Step S2) and returns to Step S1. In this procedure, the fuel filling device 71 may informs the driver that the fuel tank 15 cannot be filled with the high pressure gas (hydrogen gas as a fuel) by turning on an indicator lamp (not shown), making the indicator lamp blink or making an alarm sound, thereby prompting the user to set the center stand 33 in the raised position.

If the vehicle controller 19 determines that the center stand 33 is in the raised position (if Yes in Step S1), the vehicle controller 19 receives the sensed state from the overturn sensor 73 and determines whether the motorcycle 1 has overturned or not (or whether the motorcycle 1 is in a process of overturning or not, or whether the motorcycle 1 is likely to overturn or not) (Step S3).

If the vehicle controller 19 determines that the motorcycle 1 has not overturned (if No in Step S3), the vehicle controller 19 opens the fuel filling valve 52 to allow the flow of a fluid between the filling port 53 and the fuel tank 15 to enable of filling of the fuel tank 15 with the high pressure gas (hydrogen gas as a fuel) (Step S4) and returns to Step S1 to continue the control.

If the vehicle controller 19 determines that the motorcycle 1 has overturned (if Yes in Step S3), the vehicle controller 19 closes the fuel filling valve 52 to cut off the fluid connection between the filling port 53 and the fuel tank 15 to disable filling of the fuel tank 15 with the high pressure gas (hydrogen gas as a fuel) (Step S5) and ends the control.

Alternatively, the fuel filling device 71 may regularly monitor the sensed state from the overturn sensor 73 and store the result of the monitoring in a storage region of the vehicle controller 19, regardless of the sensed state from the stand sensor 72, that is, without performing Step S1. If the history of sensed states stored includes a overturn state of the motorcycle 1, the process can proceed from Step S3 to Step S5, in which the vehicle controller 19 closes the fuel filling valve 52 to cut off the fluid connection between the filling port 53 and the fuel tank 15 to prevent filling of the fuel tank 15 with the high pressure gas (hydrogen gas as a fuel), and end the control.

Figure 6:
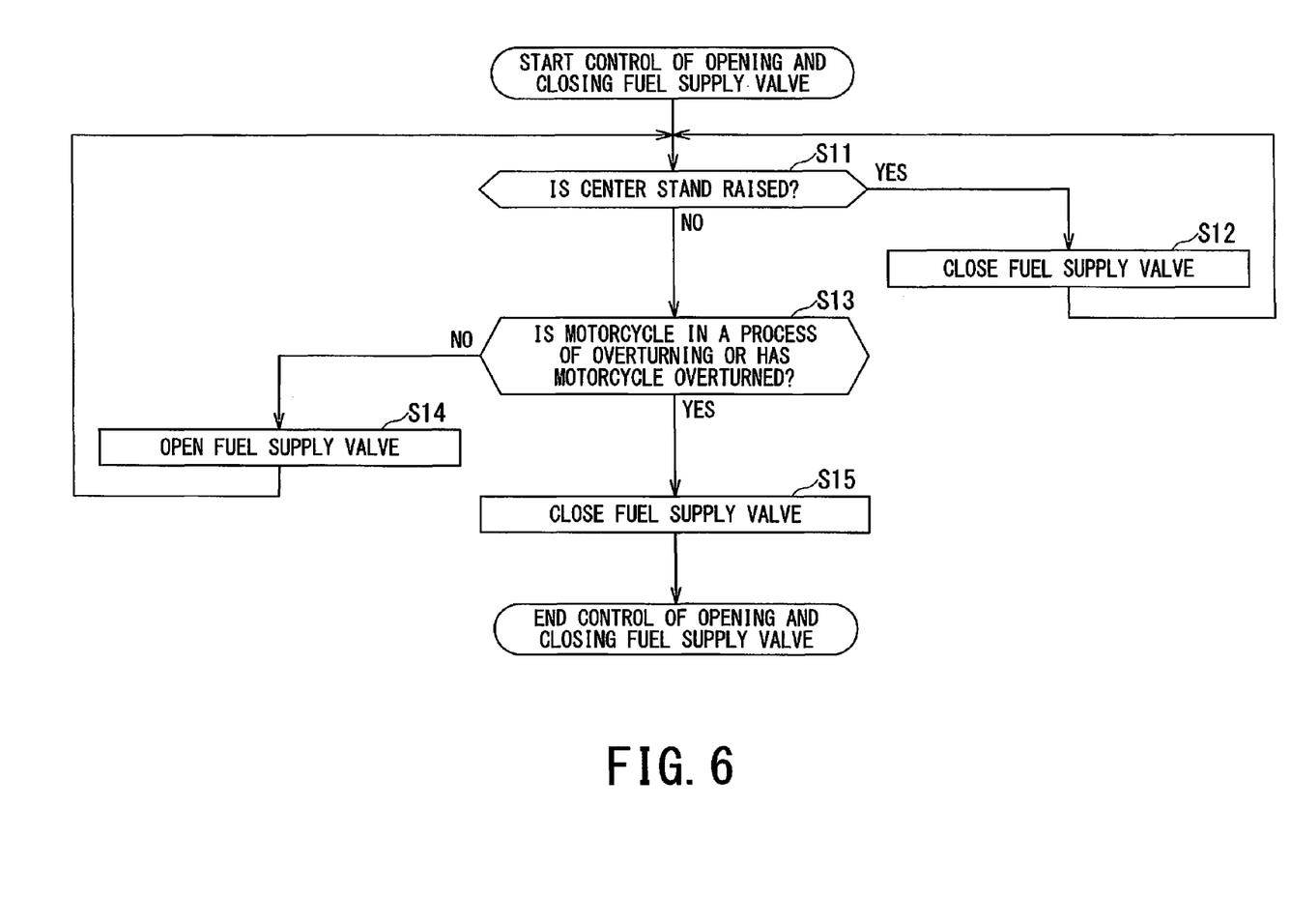
FIG. 6 is a flowchart showing a control of opening and closing a fuel supply valve performed by the fuel filling device according to the embodiment of the present invention.

Next, a control of opening and closing the fuel supply valve 55 performed by the fuel filling device 71 according to this embodiment will be described.

FIG. 6 is a flowchart showing the control of opening and closing the fuel filling valve performed by the fuel filling device according to this embodiment of the present invention.

As shown in FIG. 6, with the fuel filling device 71 according to this embodiment, the vehicle controller 19 receives the sensed state from the stand sensor 72 and determines whether the center stand 33 is in the raised position or a position other than the raised position, such as the retracted position (Step S11). If the vehicle controller 19 determines that the center stand 33 is in the raised position, (if Yes in Step S11), the vehicle controller 19 closes the fuel supply valve 55 to cut off the flow of the high pressure gas (hydrogen gas as a fuel) on the supply side of the fuel tank 15 (step S12) and returns to Step S11 (that is, when the center stand 33 is in the raised position, power generation of the fuel cell 2 is inhibited). In Steps S11 and S12, the fuel filling device 71 prevents the high pressure gas (hydrogen gas as a fuel) from flowing out to the supply side of the fuel tank 15 during filling of the fuel tank 15 with the high pressure gas (hydrogen gas as a fuel).

If the vehicle controller 19 determines that the center stand 33 is in a position other than the raised position, such as the retracted position (if No in Step S11), the vehicle controller 19 receives the sensed state from the overturn sensor 73 and determines whether the motorcycle 1 has overturned or not (Step S13).

If the vehicle controller 19 determines that the motorcycle 1 has not overturned (if No in Step S13), the vehicle controller 19 opens the fuel supply valve 55 to allow a flow of a fluid to the supply side of the fuel tank 15, that is, to the fuel cell 2 (Step S14) and returns to Step S11 to continue the control.

If the vehicle controller 19 determines that the motorcycle 1 has overturned (if Yes in Step S13), the vehicle controller 19 closes the fuel supply valve 55 to interrupt the supply of the high pressure gas (hydrogen gas as a fuel) to the supply side of the fuel tank 15, that is, to the fuel cell 2 (Step S15) and ends the control.

Alternatively, the fuel filling device 71 may regularly monitor the sensed state from the overturn sensor 73 and store the result of the monitoring in the storage region of the vehicle controller 19, regardless of the sensed state from the stand sensor 72, that is, without performing Step S11. If the history of sensed states stored includes a overturn state of the motorcycle 1, the process can proceed from Step S13 to Step S15, in which the vehicle controller 19 closes the fuel supply valve 55 to interrupt the supply of the high pressure gas (hydrogen gas as a fuel) to the supply side of the fuel tank 15, that is, to the fuel cell 2, and end the control.

The fuel filling device 71 of the motorcycle 1 according to this embodiment assumes that the upright position of the motorcycle 1 is a stable position in which filling of the fuel tank 15 with the high pressure gas (hydrogen gas as a fuel) can be allowed, and opens the fuel filling valve 52 to allow the flow of the high pressure gas (hydrogen gas as a fuel) between the fuel tank 15 and the filling port 53 if the stand sensor 72 has sensed that the center stand 33 is in the raised position. Thus, the safety of the operation of filling the fuel tank 15 with the high pressure gas (hydrogen gas as a fuel) can be improved.

The fuel filling device 71 of the motorcycle 1 according to this embodiment allows filling of the fuel tank 15 with the high pressure gas (hydrogen gas as a fuel) until an overturn of the motorcycle 1 is sensed. Thus, as far as the motorcycle 1 is unlikely to overturn and cause damage to the flow channel of the high pressure gas (hydrogen gas as a fuel), the motorcycle 1 can be normally used.

The fuel filling device 71 of the motorcycle 1 according to this embodiment inhibits filling of the fuel tank 15 with the high pressure gas (hydrogen gas as a fuel) once an overturn of the motorcycle 1 is sensed. Thus, when the motorcycle 1 accidentally overturns to cause damage to the flow channel of the high pressure gas (hydrogen gas as a fuel), filling of the fuel tank 15 with the high pressure gas (hydrogen gas as a fuel) is prevented after the overturn, so that the safety is ensured.

Furthermore, if the motorcycle 1 overturns, the fuel filling device 71 of the motorcycle 1 according to this embodiment prevents the high pressure gas (hydrogen gas as a fuel) from being supplied from the fuel tank 15 to the fuel cell 2. Thus, even if the flow channel of the high pressure gas (hydrogen gas as a fuel) is accidentally damaged, the motorcycle 1 can be prevented from running in such a damaged state.

In this way, the fuel filling device 71 of the motorcycle 1 according to this embodiment allows filling of the fuel tank with the high pressure gas only when the fuel filling device 71 has sensed that the motorcycle 1 is in the stable position.

What is claimed is:

1. A fuel filling device of a motorcycle, comprising:
   a gas tank that stores and/or supplies a high pressure gas, the gas tank being mounted on the motorcycle;
   a filling port through which the high pressure gas is fed to the gas tank for storage;
   a center stand that swings between a raised position in which the center stand supports the motorcycle in an upright position and a retracted position;
   a stand sensor that senses that the center stand is in the raised position; and
   a fuel filling valve provided between the gas tank and the filling port, the fuel filling valve allowing a flow of the high pressure gas between the gas tank and the filling port if the stand sensor senses that the center stand is in the raised position.

2. The fuel filling device of a motorcycle according to claim 1, further comprising:
   an overturn sensor that senses that the motorcycle is in a process of overturning or the motorcycle has overturned,
   wherein the fuel filling valve allows the flow of the high pressure gas between the gas tank and the filling port until the overturn sensor senses that the motorcycle is in a process of overturning or the motorcycle has overturned.

3. The fuel filling device of a motorcycle according to claim 2, wherein the fuel filling valve cuts off the flow of the high pressure gas between the gas tank and the filling port once the overturn sensor senses that the motorcycle is in a process of overturning or the motorcycle has overturned.

4. The fuel filling device of a motorcycle according to claim 2 further comprising:
   a fuel supply valve that is provided on a supply side of the gas tank,
   wherein the fuel supply valve cuts off a flow of the high pressure gas on the supply side of the gas tank once the overturn sensor senses that the motorcycle is in a process of overturning or the motorcycle has overturned.

5. The fuel filling device of a motorcycle according to claim 3, further comprising:
   a fuel supply valve that is provided on a supply side of the gas tank,
   wherein the fuel supply valve cuts off a flow of the high pressure gas on the supply side of the gas tank once the overturn sensor senses that the motorcycle is in a process of overturning or the motorcycle has overturned.

* * * * *